(12) United States Patent
Opitz et al.

(10) Patent No.: US 11,465,237 B2
(45) Date of Patent: Oct. 11, 2022

(54) GAS SUPPLY DEVICE AND LASER PROCESSING HEAD COMPRISING SAME

(71) Applicant: Precitec GmbH & Co. KG, Gaggenau (DE)

(72) Inventors: Florian Opitz, Offenburg (DE); Christian Loose, Gaggenau (DE)

(73) Assignee: Precitec GmbH & Co. KG, Gaggenau (DE)

( * ) Notice: Subject to any disclaimer, the term of this patent is extended or adjusted under 35 U.S.C. 154(b) by 0 days.

(21) Appl. No.: 16/967,103

(22) PCT Filed: Jan. 31, 2019

(86) PCT No.: PCT/EP2019/052379
§ 371 (c)(1),
(2) Date: Aug. 3, 2020

(87) PCT Pub. No.: WO2019/149819
PCT Pub. Date: Aug. 8, 2019

(65) Prior Publication Data
US 2020/0361032 A1    Nov. 19, 2020

(30) Foreign Application Priority Data
Feb. 2, 2018   (DE) .......................... 102018102337.5

(51) Int. Cl.
*B23K 26/14*  (2014.01)
*B23K 26/142* (2014.01)
(Continued)

(52) U.S. Cl.
CPC ........ *B23K 26/1476* (2013.01); *B23K 26/142* (2015.10); *B23K 26/0665* (2013.01);
(Continued)

(58) Field of Classification Search
CPC .............. A61K 39/39; A61K 2039/521; A61K 2039/545; A61K 2039/55511;
(Continued)

(56) References Cited

U.S. PATENT DOCUMENTS 4,467,171 A     8/1984 Ramos
8,901,453 B2 *  12/2014 Miyagi ................ B23K 26/144
                                                   219/121.84
(Continued)

FOREIGN PATENT DOCUMENTS

CN    105436720 A    3/2016
CN    205834508 U   12/2016
(Continued)

OTHER PUBLICATIONS

International Search Report dated May 17, 2019, International Applicaton PCT/EP2019/052379.

*Primary Examiner* — Joel M Attey
*Assistant Examiner* — Adam Michael Eckardt
(74) *Attorney, Agent, or Firm* — Dinsmore & Shohl LLP (57) ABSTRACT

A gas supply device for a laser machining head is provided for generating a homogeneous gas flow. The gas supply device includes a gas inlet, a shared volume for superimposing a laser beam and the gas flow, and a gas channel system which, starting from the gas inlet, branches at least twice and connects the gas inlet with several outlet openings (Continued)

at the shared volume. The gas channel system and the outlet openings are configured to provide a substantially homogeneous gas flow to the shared volume.

20 Claims, 7 Drawing Sheets (51) Int. Cl.
*B23K 103/04* (2006.01)
*B23K 26/06* (2014.01)
*B23K 26/38* (2014.01)

(52) U.S. Cl.
CPC .......... *B23K 26/1438* (2015.10); *B23K 26/38* (2013.01); *B23K 2103/04* (2018.08)

(58) Field of Classification Search
CPC .......... A61K 2039/55555; A61K 2039/55594; A61K 2039/577; A61K 2039/58; A61K 2039/585; A61K 35/74; A61K 36/064; A61K 39/0011; A61K 39/025; A61K 39/0258; A61K 39/0266; A61K 39/092; A61P 37/04; A61P 1/00; A61P 29/00; A61P 35/00; B23K 26/142; B23K 26/1435; B23K 26/1476; B23K 26/38; B23K 2103/04; B23K 26/0665; B23K 26/1438; B23K 26/14; B23K 26/70; C12Q 2600/106; C12Q 2600/112; C12Q 2600/118; C12Q 2600/158; G01N 2333/065; G01N 2800/50; G01N 33/574; G01N 33/6863; Y02A 50/30
See application file for complete search history.

(56) References Cited

U.S. PATENT DOCUMENTS

| 2012/0037604 | A1 | 2/2012 | Shikata | |
|---|---|---|---|---|
| 2015/0328718 | A1 | 11/2015 | Iwatani et al. | |
| 2017/0259377 | A1* | 9/2017 | Ohno | B23K 26/34 |
| 2017/0266675 | A1* | 9/2017 | Ohno | B05B 7/228 |

FOREIGN PATENT DOCUMENTS

| CN | 206550502 U | 10/2017 |
|---|---|---|
| DE | 3637568 A1 | 5/1988 |
| DE | 69308546 T2 | 11/1997 |
| EP | 0695600 A2 | 2/1996 |
| EP | 1016493 A2 | 7/2000 |
| EP | 2946871 A2 | 11/2015 |
| GB | 2163692 A | 3/1986 |
| JP | H 04-84687 A | 3/1992 |
| JP | H 05185265 A | 7/1993 |
| JP | H09220662 A | 8/1997 |
| JP | H 10180477 A | 7/1998 |
| JP | 2000 225487 A | 8/2000 |
| JP | 2000-225488 A | 8/2000 |
| JP | 2004-148360 A | 5/2004 |
| JP | 2005021908 A | 1/2005 |
| JP | 2015217397 A | 12/2015 |
| JP | 2017-170477 A | 9/2017 |
| WO | 2016135907 A1 | 9/2016 |

* cited by examiner

GAS SUPPLY DEVICE AND LASER PROCESSING HEAD COMPRISING SAME

CROSS-REFERENCE TO RELATED APPLICATIONS

This application is the U.S. national stage of PCT/EP2019/052379 filed Jan. 31, 2019, which claims priority of German Patent Application 102018102337.5 filed Feb. 2, 2018 both of which are hereby incorporated by reference in their entirety.

FIELD OF THE INVENTION

The present disclosure relates to a gas supply device and a laser machining head comprising the same, such as a laser machining head for laser cutting. The present disclosure particularly relates to a gas supply for laser cutting of a workpiece.

BACKGROUND OF THE INVENTION

In a device for machining material by means of laser, e.g., in a laser machining head, for example for laser welding or laser cutting, the laser beam exiting from a laser light source or an end of a laser guide fiber is focused or collimated onto the workpiece to be machined using a beam guiding and focusing optics. Typically, a laser machining head with a collimator optics and a focusing optics is used, the laser light being supplied via an optical fiber.

When cutting metallic materials using laser radiation, a gas flow usually emerges from the machining head along with the laser beam. For this purpose, a cutting nozzle through which laser radiation and cutting gas are directed onto a workpiece to be machined is attached to the machining head. The cutting gas achieves various objects in the cutting process. On the one hand, it supports the expulsion of the melted material from the kerf by transmitting pressure and shear forces on the cutting front and on the cutting flanks. This function of the cutting gas dominates when cutting stainless steel, which is why an inert medium (usually nitrogen $N_2$) is used in this case of application. In contrast, when cutting structural steel, a reactive gas is used (usually oxygen $O_2$). The cutting gas supports the separation process in this case of application by enabling the conversion of iron to iron oxide. In this way, in addition to the laser radiation, reaction heat is additionally introduced into the process. Moreover, the function of the melt expulsion is also maintained when cutting structural steel. As a third object, the cutting gas prevents contamination of the last optical element in the machining head by deflecting process emissions through momentum transfer.

For the above-mentioned functions of the cutting gas—above all the melt expulsion and the oxidation reaction—it is advantageous if flow variables are distributed as homogeneously and symmetrically as possible over the flow cross-section during the exit from the cutting nozzle. The uniform distribution of the flow quantities gains importance for the process result with the machining of increasing sheet thicknesses (s>10 mm) and the use of increasing laser powers (P>4 kW). A distribution of the flow variables that is as uniform as possible improves the surface quality and perpendicularity of the resulting cutting edges and enables higher cutting speeds.

U.S. Pat. No. 4,467,171 A describes a laser cutting nozzle for a laser cutting device which directs a focused beam to a point on a workpiece. The nozzle has a cylindrical body with a conical tip having a conically shaped hollow interior. A plurality of gas inlet holes extends through the body to the hollow interior so that a gas vortex flow is generated coaxially through the nozzle and directed to the workpiece by an opening at the conical tip.

EP 0 695 600 A2 describes a laser machining head comprising a gas distributor for introducing gas next to a focusing lens held within the housing. The gas distributor consists of a plurality of angled distribution slots creating a gas vortex flow directed away from the surface of the lens and toward the nozzle outlet.

SUMMARY OF THE INVENTION

It is an object of the present disclosure to provide a gas supply device for a machining head and a machining head comprising the same, in particular a laser machining head for laser cutting, whereby improved surface quality and perpendicularity of the cutting edges and higher cutting speed are achieved.

This object is achieved by the subject matter disclosed herein. Advantageous embodiments of the invention are also disclosed.

According to embodiments of the present disclosure, a gas supply device for a laser machining head for generating a homogeneous gas flow comprises a gas inlet, a shared volume for superimposing a laser beam and the gas flow, and a gas channel system branching at least twice starting from the gas inlet and connecting said gas inlet with a plurality of, e.g. at least three, outlet openings at the shared volume. In other words, the gas channel system may include at least two branching points, which may be arranged consecutively along the flow path from the gas inlet to the shared volume, and/or include at least three gas channels, each of which connects the gas inlet to at least one outlet opening. The gas system may include at least one branching point at which the gas flow flowing through the branching point is split in half into two subsequent gas channels. As an alternative or in addition, the gas channel system may include at least one branching point at which the gas flow is evenly distributed over at least three gas channels.

According to further embodiments of the present disclosure, a gas supply device for a laser machining head for generating a homogeneous gas flow comprises a gas inlet, a shared volume for superimposing a laser beam and the gas flow, and a gas channel system that branches out starting from the gas inlet into at least three gas channels, each of which connects the gas inlet with at least one outlet opening at the shared volume. The gas channels may be configured such that the gas flow is evenly applied thereto. The distribution in the gas channel system is preferably carried out in such a way that the same number of branching points is located between the gas inlet and each outlet opening at the shared volume. It is particularly preferred that the same number of gas channels branch at branching points spaced from the gas inlet by the same number of branching points.

For example, a first gas channel connected to the gas inlet may be split into two second (subsequent) gas channels at a first branching point and the second gas channels may each be split into two third gas channels at a second branching point. The third gas channels may be connected to one outlet opening each. Alternatively, the third gas channels may be branched in half at least once more at further branching points.

A channel section or channel length, or path length from the gas inlet to each outlet opening may essentially be of the same length.

The gas channels are preferably separated from one another or not connected to one another downstream of the at least one branching point. Thus, the gas introduced through the gas inlet is split into several gas channels and only merged again in the shared volume. Here, the gas channels may connect the gas inlet to exactly one outlet opening at the shared volume. Alternatively, the gas channels may be merged before the shared volume. For example, an element for rectifying the flow may additionally be provided between this point of merging and the shared volume.

The gas channel system and the outlet openings may be configured to provide an essentially homogeneous gas flow in and/or out of the shared volume. The branched gas channel system and a plurality of outlet openings at the shared volume make it possible to provide a gas flow with a homogeneous and symmetrical distribution of important flow variables over a flow cross section, thereby improving functions of the gas, such as melt expulsion and oxidation during laser cutting, and thereby also improving machining quality. The outlet openings may be arranged on a peripheral region of the shared volume. The outlet openings may be arranged symmetrically on the shared volume or on a periphery of the shared volume. The gas flow may additionally be homogenized by a symmetrical arrangement of the outlet openings on a periphery of the shared volume. The gas supply device may be configured to coaxially superimpose the gas flow and the laser beam and to output them through the outlet opening.

Furthermore, the gas supply device may have an outlet opening at a first end of the shared volume for providing the homogeneous gas flow. At a second end of the shared volume opposite the outlet opening, the gas supply device may comprise fastening means for fastening the gas supply device to a laser machining head. The gas supply device may also be integrated in the laser machining head or be part of the same. For example, the gas channel system may be configured as bores in at least one element of the laser machining head. As a result, vibrations and also the outer dimensions of the laser machining head can be reduced.

The gas channel system or the outlet openings is preferably configured such that the gas flow flowing through each outlet opening forms an angle between 0° and 90° with respect to an axis of symmetry of the shared volume which extends centrally through the outlet opening of the gas supply device. Here, the gas flow flowing through each outlet opening may be directed away from the outlet opening of the gas supply device. In other words, the gas flow flowing through each outlet opening may be directed in the direction of a (second) end of the shared volume opposite the outlet opening.

The gas supply device may have a central plane, at least a portion or a part of the gas channel system, and preferably the entire gas channel system, being symmetrical to the central plane. The center plane may be essentially parallel to an optical axis of the laser machining head. The optical axis may extend in the central plane. The central plane may include the optical axis and extend centrally through the gas inlet. For example, the central plane may be a symmetry plane of the shared volume. The central plane may extend from the first end of the shared volume to the second end of the shared volume.

Furthermore, a branching of the gas channel system may be symmetrical about the central plane at an associated branching point. For example, the gas channel system may split into two channels at each branching point. In other words, the gas channel system may be configured to split the gas flow symmetrically or in half at a branching point. In one example, the gas channel system may be symmetrical about the central plane of a first branching point. That is, the entire gas channel system has a symmetry plane through the first branching point.

The gas channel system may comprise at least one accumulation chamber providing at least one accumulation volume. The accumulation chamber can be annular. The accumulation chamber may surround the shared volume or be formed to extend around the shared volume. The accumulation chamber or the accumulation volume is preferably arranged between the gas channels and the outlet openings at the shared volume. In other words, the gas channels of the gas channel system may open into an accumulation volume. A channel length of the gas channels or a path length from the gas inlet to the accumulation volume may be the same for all gas channels The gas channel system may comprise at least one rectifier element. The rectifier element may be arranged in such a way that the gas flow from the gas channel system and/or from the accumulation volume is conducted into the shared volume via the rectifier element. In other words, the rectifier element may be arranged between the gas channel system and the shared volume or the outlet openings at the shared volume, or between the accumulation chamber and the shared volume or the outlet openings at the shared volume. If the rectifier element is arranged between the gas channel system and the outlet openings at the shared volume or between the accumulation volume and the outlet openings at the shared volume, a channel length of the gas channels or a path length from the gas inlet to the rectifier element may be the same for all gas channels.

The rectifier element may be selected from the group comprising the tube bundles, sieves, fins, honeycomb elements and calming sections or the like. For example, the rectifier element may comprise a plurality of calming sections distributed symmetrically around the periphery of the shared volume. A number of calming sections may be between 4 and 24 or between 8 and 16 and/or the calming sections may have a ratio D/L of section diameter D to section length L between 0.05 and 0.3 or between 0.1 and 0.3.

The outlet openings may have a substantially circular, oval or elongated cross section.

The gas inlet may be the only gas inlet to the gas channel system. A single gas inlet is easier to connect and handle for a user. In addition, only one connection line is required for connection to a gas source, so that a large number of connection lines is unnecessary. This is particularly advantageous for movable laser machining heads. This also ensures that connecting the machining head to the gas source has no negative impact on the homogeneity of the gas flow in the shared volume since hydraulic differences between the supply lines due to different lengths, diameters or different routing paths are excluded with only one connecting line. If there are a plurality of gas inlets, each gas inlet is connected to one outlet opening via at least three gas channels. The gas channel system associated with each gas inlet may comprise at least one branching point at which at least three gas channels branch off, or at least two branching points at each of which two gas channels branch off.

The gas channel system and the outlet openings may be configured to provide an essentially uniform distribution of one or more flow variables of the gas flowing in the shared volume and/or of the gas flowing out of the shared volume.

The one or more flow variables may be selected from the group consisting of a flow speed, a flow direction, a static pressure and a gas density.

The gas supply device may be configured such that an optical axis of the laser machining head and an axis of the gas flow are substantially coaxially superimposed in the shared volume.

The gas supply device is preferably a gas supply device for supplying cutting gas. In other words, the gas flow may in particular consist of cutting gas.

Furthermore, a laser machining head is specified, the laser machining head comprising a laser device for providing a laser beam and a gas supply device for generating a homogeneous gas flow according to one of the exemplary embodiments described herein.

The laser machining head may further comprise an optical element, such as a focusing optics or a protective glass. The shared volume may be arranged directly adjacent to the optical element or may adjoin it. The laser machining head may further comprise a nozzle with a nozzle opening configured such that a laser beam and a gas jet can be directed through the nozzle opening onto a workpiece. In particular, the optical element may be a last optical element in the beam path of the laser beam.

According to further embodiments of the present disclosure, a method for laser machining is specified. The method comprises introducing a gas flow into a gas inlet, splitting the gas flow in a gas channel system with at least two branches, supplying the gas from the gas channel system to a shared volume, and superimposing a laser beam with the supplied gas flow in the shared volume.

According to the present disclosure, the branched gas channel system may provide a substantially homogeneous and symmetrical gas supply to the shared volume. The gas supply device according to the invention may in particular provide a uniform distribution of important flow variables at the outlet opening. The branched gas channel system according to the invention allows for improved surface quality and perpendicularity of the cut edges as well as a higher cutting speed.

BRIEF DESCRIPTION OF THE DRAWINGS

Exemplary embodiments of the disclosure are shown in the figures and are described in more detail below. In the figures.

DETAILED DESCRIPTION OF THE PREFERRED EMBODIMENTS

Unless otherwise noted, the same reference symbols are used in the following for the same and equivalent elements.

Figure 1:
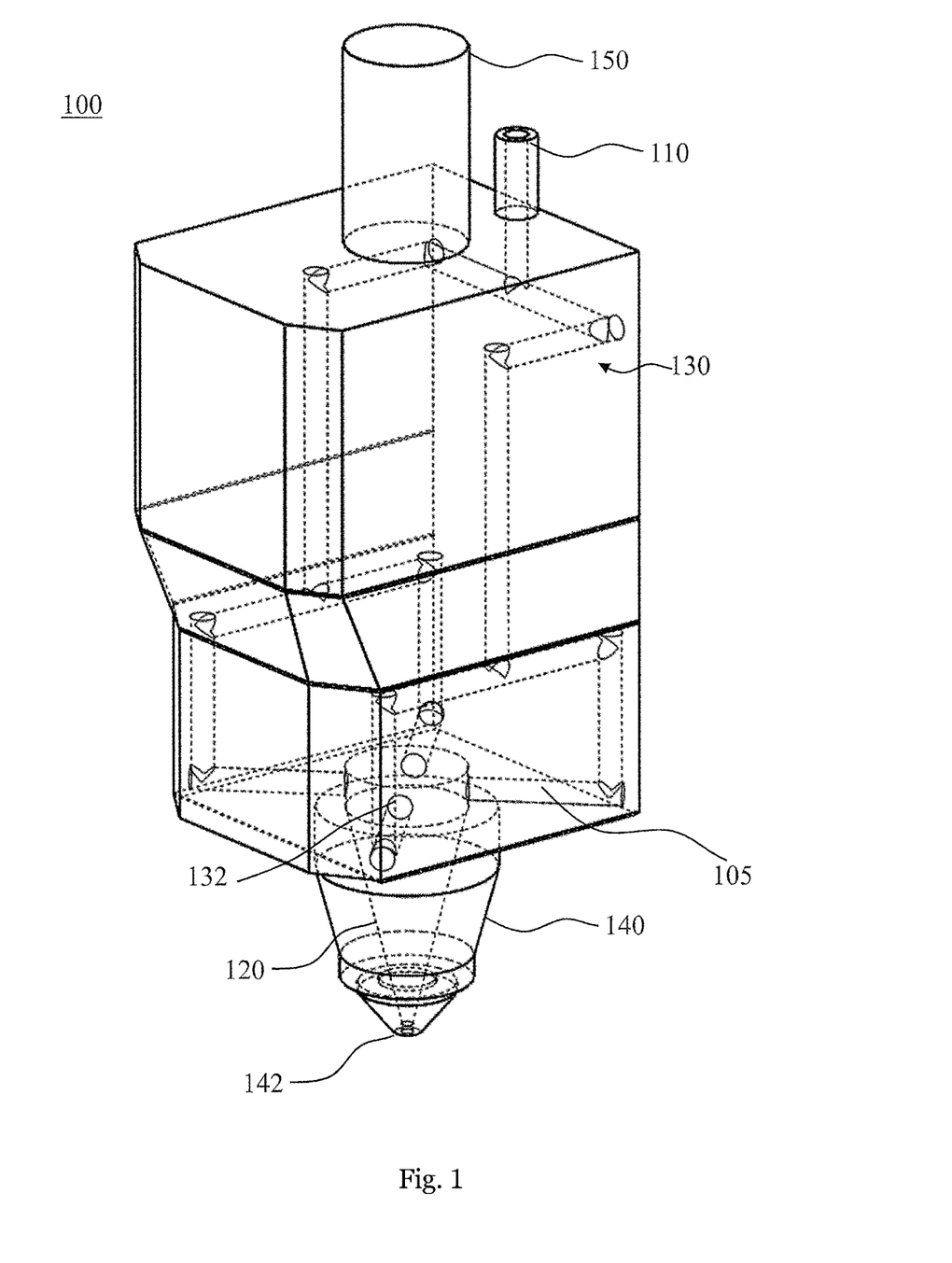
FIG. 1 is a schematic diagram of a laser machining head with a gas supply device integrated therein according to embodiments of the present disclosure.

FIG. 1 shows a gas supply device for a laser machining head for generating a homogeneous gas flow according to embodiments of the present disclosure. In the embodiment shown, the gas supply device is integrated in the laser machining head 100 or a part thereof. In other embodiments, the gas supply device may be attached to a lower part or tip of the laser machining head 100, e.g. for laser cutting.

The gas supply device 100 for a laser machining head for generating a homogeneous gas flow comprises a gas inlet 110 (e.g., a pneumatic fitting), a shared volume 120 for superimposing a laser beam and a gas flow, and a gas channel system 130 branching at least twice starting from the gas inlet 110 and connecting the gas inlet 110 via a plurality of gas channels 105 with one outlet opening 132 each at a shared volume. The gas channel system 130 and the outlet openings 132 are configured to provide a substantially homogeneous gas flow in or out of the shared volume.

A distribution of important flow variables at the outlet which is as uniform as possible requires that these flow variables are distributed as uniform as possible in the shared volume of (cutting) gas and laser beam. The convergent course of the shared volume has a homogenizing influence on the gas flow, but this calming section is not sufficient to fully develop the flow—especially in case of shorter focal lengths below approximately f=200 mm.

According to the present disclosure, the branched gas channel system is therefore used to achieve a uniform distribution of flow variables in the shared volume and/or at an exit opening 142 of the gas supply device 100. If the gas in the machining head is guided from the gas inlet 110 directly to the last optical element, for example, no uniform distribution in the shared volume would be achieved. The disclosure therefore provides for the gas channel to be split several times and to be merged again symmetrically, e.g. before the last optical element of the laser machining head, such as a focusing lens and/or a protective glass.

The laser machining head, for example for laser cutting, according to embodiments of the present disclosure comprises a laser device for providing a laser beam, such as an optical fiber. The laser beam may also be referred to as a "machining beam" or "machining laser beam". The laser machining head is configured to direct the laser beam onto a machining area of a workpiece. The laser machining head may have a collimator lens for collimating the laser beam and a focusing optics, such as a focusing lens or arrangement of focusing lenses, for focusing the laser beam onto the workpiece.

The laser machining head further comprises the gas supply device 100 for generating a homogeneous gas flow in accordance with the embodiments described herein. The gas supply device 100 may be configured such that a laser beam supplied by the laser machining system and the gas flow supplied through the gas inlet 110 and guided via the gas channel system are substantially coaxially superimposed in the shared volume. For example, an optical access 150, through which the laser beam can enter the shared volume and which may be a fiber bushing, may be provided.

According to embodiments, the laser machining head may be movable along a machining direction. The machining direction may be a cutting direction and/or a movement direction of the laser machining head with respect to the workpiece. In particular, the machining direction may be a horizontal direction. The machining direction may also be referred to as the "cutting direction" or "feed direction".

Figure 2:
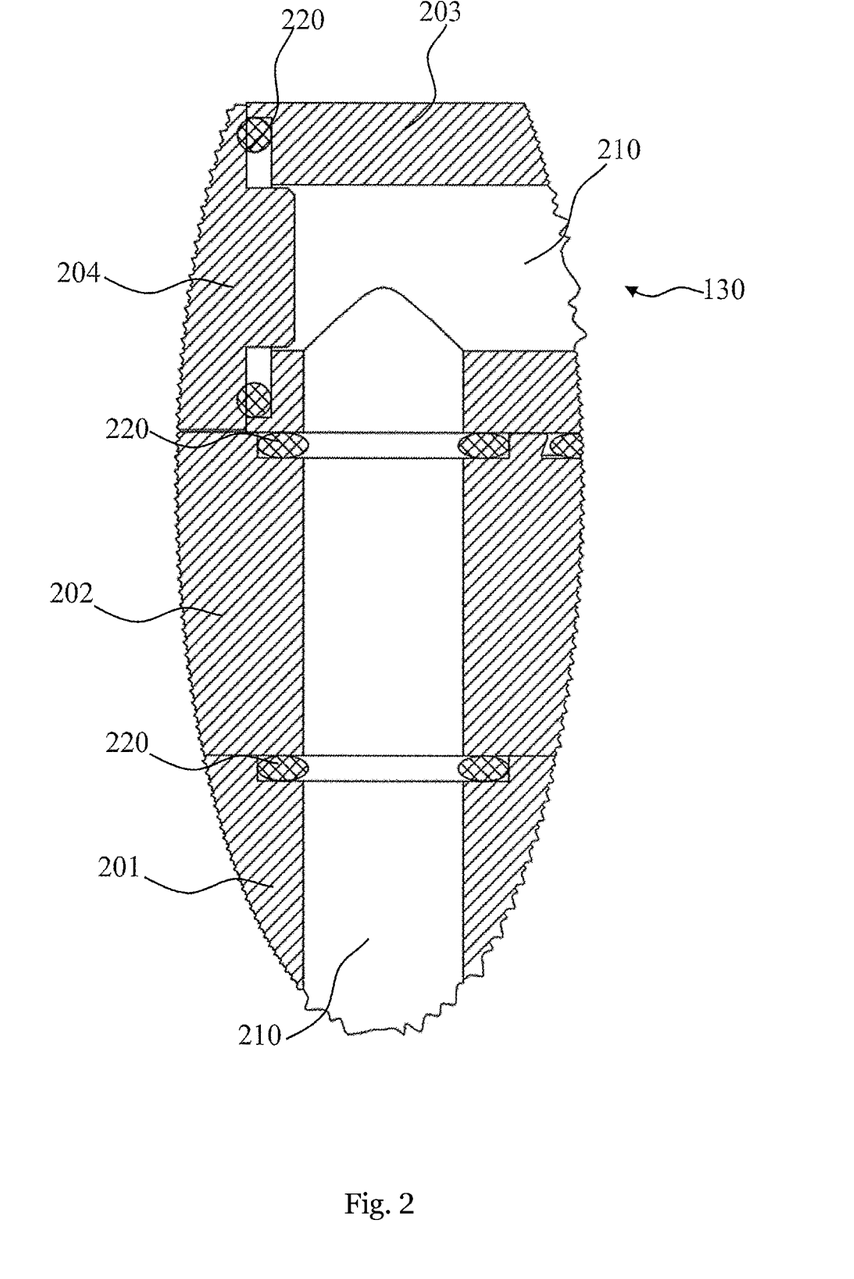
FIG. 2 is a cross-sectional view showing a principle of the configuration of the gas channel system of a gas supply device according to embodiments of the present disclosure.

FIG. 2 shows the principle of the configuration of a channel of the gas channel system 130 of the gas supply device 100 according to the invention. If, as shown in FIG. 1, the gas supply device 100 is integrated in the laser machining head, the gas channel system 130 may be realized by bores 210 in one or more elements 201, 202, 203, 204 of the laser machining head.

With reference to FIG. 2, the gas channel system 130 after the gas inlet 110 comprises lines or channels, such as bores 210, in one or more components or elements 201, 202, 203, 204 of the gas supply device 100 or the laser machining head. The bores 210 may be arranged in such a way that they branch out several times and the gas flow is thus fanned out ever further. For example, the gas supply device 100 may include at least one element having a cavity or chamber, said cavity or chamber defining the shared volume. In addition, bores 210 defining the gas channel system 130 may be provided in the at least one element. In some embodiments, the gas supply device 100 may consist of a plurality of components or elements 201, 202, 203, 204 (which may also be components or elements of the laser machining head), each of which has bores 210 and may be connected or connectable to one another. Corresponding sealing rings 220 may be provided between the individual components or elements in order to ensure loss-free guidance of the gas. FIG. 2 shows, by way of example, how a flow channel for the (cutting) gas is created by joining several components together. Thus, the gas duct after the gas inlet 110 may be split several times and may then be merged symmetrically in the shared volume.

The gas channel system 130 may comprise a plurality of bores 210 or gas channels 105 extending at an angle with respect to one another. In other words, at least some bores 210 or channels 105 may not extend in parallel to one another. For example, at least some bores 210 or channels 105 may extend perpendicularly to one another. Typically, the gas channel system 130 includes vertical and horizontal bores 210 or channels 105 that are interconnected. A change of direction of the bores 210 or channels 105 may take place, for example, at each branching of the gas channel system 130.

The gas supply device 100 comprises the exit opening 142 at a first end of the shared volume. The exit opening 142 may represent the smallest diameter of the gas supply device 100 or the entire gas duct, so that the highest speed is present at this point and the mass flow may be determined here in the case of supercritical flow conditions. The gas supply device 100 may be configured to be attached to the laser machining head at a second end of the shared volume. The second end of the shared volume may be arranged opposite the first end. Alternatively, the gas supply device may be part of the laser machining head or may be integrated therein.

The substantially homogeneous gas flow may be the gas flow flowing in the shared volume and/or the gas flow flowing out of the shared volume. In particular, the branched gas channel system, the outlet openings, and the shared volume may be configured that a substantially homogeneous gas flow exits from the gas supply device 100 or from the exit opening 142. According to some embodiments, which may be combined with other embodiments described herein, the gas channel system 130 and the outlet openings are configured to provide a substantially uniform distribution of one or more flow variables of the gas flowing in the shared volume and/or of the gas exiting from the shared volume through the exit opening 142. The one or more flow quantities may be selected from the group consisting of a flow speed, a flow direction, a static pressure and a gas density and the like.

The gas, which may also be referred to as a "cutting gas", may be an inert gas, such as nitrogen, or a reactive gas, such as oxygen, according to embodiments. For example, nitrogen ($N_2$) may be used when cutting stainless steel. On the other hand, oxygen ($O_2$) may be used when cutting structural steel. The cutting gas supports the separation process in this case of application by facilitating the conversion of iron to iron oxide. In this way, in addition to the laser radiation, reaction heat is additionally introduced into the process.

Typically, the gas supply device 100 may comprise a cutting nozzle 140 that contains the shared volume 120 or is disposed at a first end of the shared volume 142. The cutting nozzle 140 may include the exit opening 142. The laser radiation and the (cutting) gas emerging from the shared volume may be directed through the exit opening 142 of the cutting nozzle 140 onto a machining spot of a workpiece.

The gas inlet 110 may be the only gas inlet to the gas channel system 130. In other words, in some embodiments, the gas may only be supplied through a single gas inlet. The gas inlet 110 may be arranged on the side or at the top of the gas supply device 100 or on the machining head. The cutting gas may be fed into the gas inlet 110 either directly from the outside through a tube or through other components of the machining head from the inside.

The uniform distribution of the gas in the shared volume is made more difficult, in particular, when the gas is usually fed into the shared volume 120 through a single inlet. This results in a strong directional dependence of all flow variables in the shared volume depending on the position of the inlet. The use of a single inlet or only a few inlets is desirable in light of applications, since it facilitates the connection and supply of the cutting gas from a gas bottle bundle to the machining head. The branched gas channel system according to the invention enables a uniform distribution of the flow variables in the shared volume despite one-sided connection of the gas supply line.

The gas supply device 100 may be attached to or integrated in a laser machining head. According to embodiments, the laser machining head comprises an optical element, which in particular may be the last optical element in the beam path of the laser beam. Typically, the optical element is a focusing optics (e.g., a focusing lens or an arrangement of a plurality of focusing lenses that may define the optical axis) or a protective glass protecting the focusing optics located in front thereof from contamination by process emissions. The gas supply device 100 may be fastened to or integrated in the laser machining head in such a way that the optical element is arranged at the second end of the shared volume opposite the exit opening 142. In particular, the shared volume can be arranged directly subsequent to the optical element. In other words, there are no further optical elements between the optical element and the shared volume. In particular, the shared volume may be arranged between the optical element and the exit opening 142. The (cutting) gas and the laser beam may therefore be combined (i.e., superimposed or overlapped) below the last optical element. Starting from the last optical element, the laser radiation and gas flow are guided in the shared volume, which may be convergent toward the exit opening 142.

According to embodiments, the gas supply device 100, and in particular the gas channel system 130, is configured to provide a substantially homogeneous or uniform gas supply along an entire periphery of the optical element of the laser machining head. The periphery of the optical element is typically defined in a plane perpendicular to the optical axis which is provided, for example, by the focusing optics.

In some embodiments, the outlet openings 132 to the shared volume may be arranged such that the gas flow is directed toward the second end of the gas supply device 100, which can be attached to the laser machining head, or toward the optical element of the laser machining head. For example, the gas flow may be directed substantially perpendicularly to the optical element. Typically, the outlet openings may be oriented at an angle with respect to the vertical and/or the optical axis. According to embodiments, the angle with respect to the vertical may be an angle between 0° (perpendicular to the optical element) and 90° (parallel to the optical element).

Figure 3:
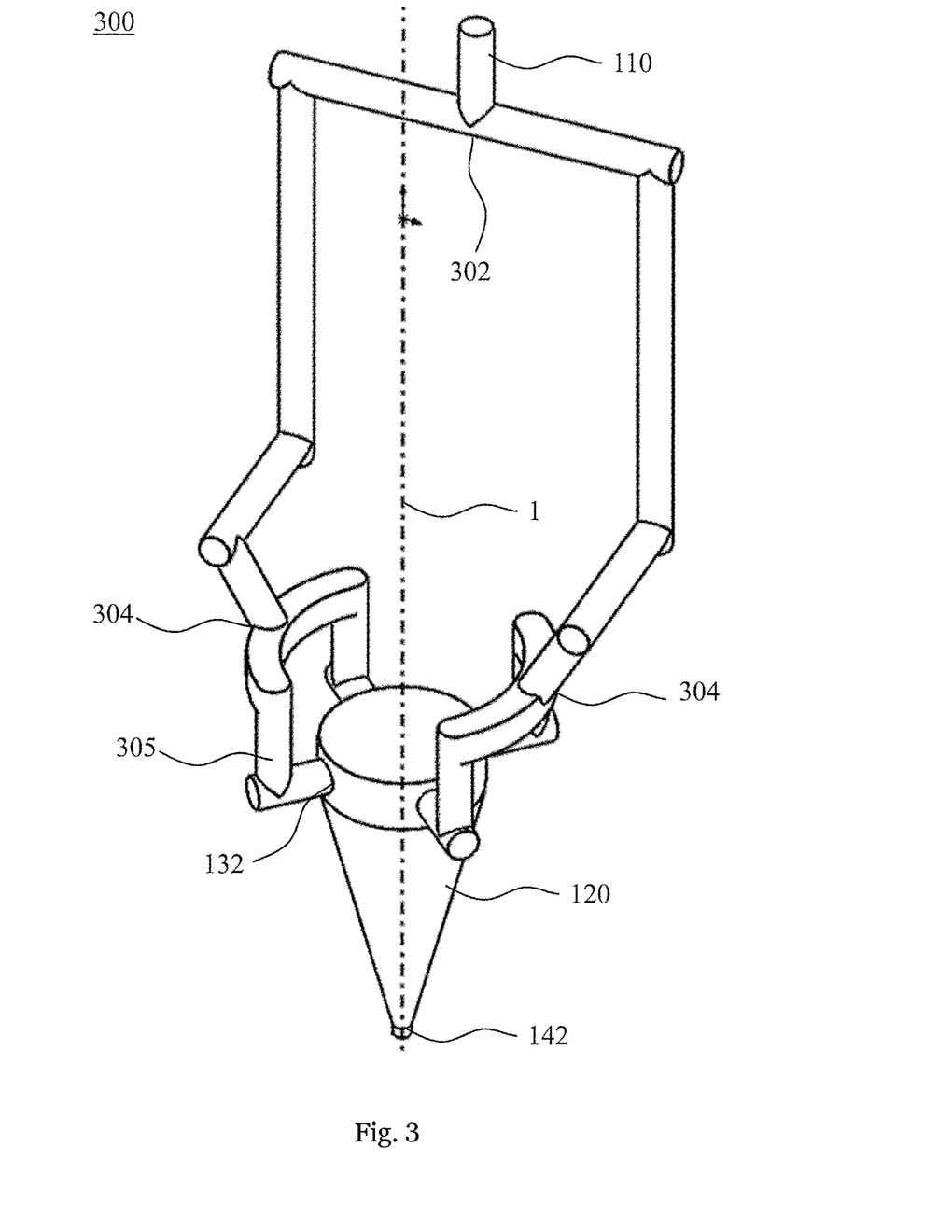
FIG. 3 is a schematic showing a gas channel system of a gas supply device according to embodiments of the present disclosure.

FIG. 3 shows a gas channel system 300 according to embodiments of the present disclosure. FIG. 3 schematically shows a gas duct of a laser cutting head according to the invention, branching out three times from the inlet 110 and being symmetrically merged again in the shared volume 120. Here, the gas channel system thus has four gas channels 305, each connecting the gas inlet 110 to the shared volume 120 via an outlet opening 132. The volume that the gas occupies in the gas supply device or in the cutting head is shown. The structure of the gas supply device (or the cutting head) thus represents the corresponding negative shape.

In addition to the gas volume, FIG. 3 shows an optical axis 1 which is an axis of the laser beam. The single gas inlet 110 (e.g., a cutting gas port) is shown at the top of the fluid volume. From here, the gas duct branches several times at the branching points 302 and 304 into a total of four gas channels 305. The gas is then passed to the shared volume 120 through four outlet openings 132, i.e. supply lines. According to embodiments, the number of gas channels correlates or scales with the number of outlet openings 132. Two or more branches or branching points can be provided. For example, three branching points are shown in FIG. 3, and seven branching points in FIG. 4.

The gas supply device may have a central plane. The central plane may be substantially parallel to the optical axis 1 of the laser machining head. The central plane may extend from the first end of the shared volume 120 to the second end of the shared volume 120. Typically, at least a portion of the gas channel system 300, and preferably the entire gas channel system 300 (with or without the gas inlet 110) is symmetrical about the central plane. For example, the central plane may be a symmetry plane of the shared volume 120. The symmetry may be mirror symmetry.

The outlet openings 132 may be arranged symmetrically around a periphery of the shared volume 120, and in particular may be arranged symmetrically with respect to the central plane. The multi-branched gas channel system 300 may supply the gas to the symmetrically arranged outlet openings 132, so that a homogeneous gas supply to the shared volume 120 and a homogeneous gas flow within the shared volume 120 can be achieved.

According to embodiments, the gas duct at each branch may be structured symmetrically with respect to a respective central plane in order to ensure a uniformly distributed flow through the following gas channels. This ensures that the same volume flow is passed through each of the gas channels to the shared volume 120, resulting in a uniformly distributed, isotropic distribution of important flow variables in the shared volume 120.

Figure 4:
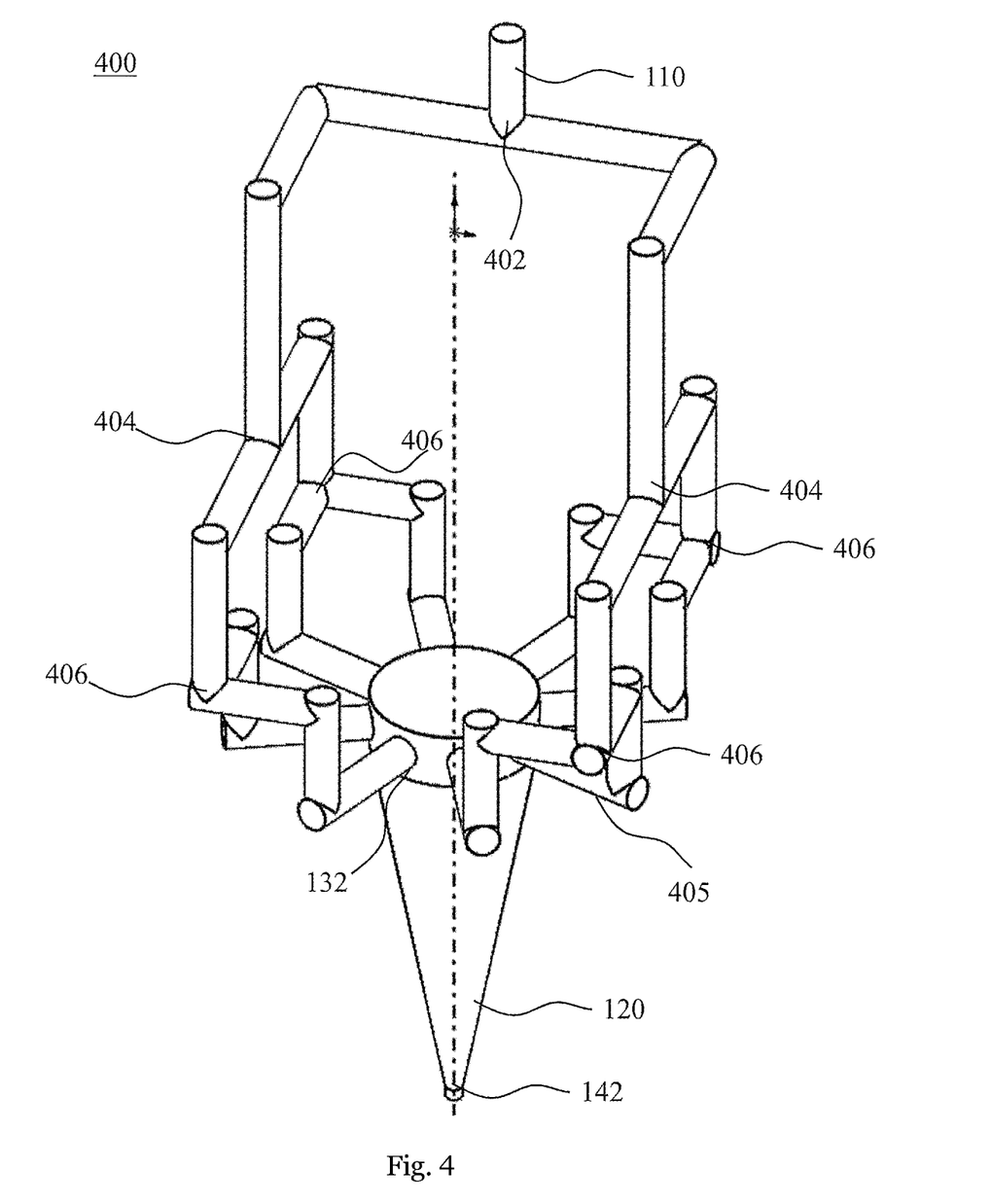
FIG. 4 is a schematic showing a gas channel system of a gas supply device according to further embodiments of the present disclosure.

FIG. 4 shows a gas channel system 400 according to further embodiments of the present disclosure. Here, FIG. 4 shows a gas duct according to the invention with a split into eight gas channels 405 and eight outlet openings 132. Again, the gas duct is continued symmetrically with respect to a central plane at each branch 402, 404, 406. The more gas channels 405 or outlet openings 132 are available in the shared volume 120, the more uniformly essential flow variables are distributed in the shared volume 120.

In some embodiments, a symmetrical continuation of the gas channels is not provided at every branch. One reason for this may be that only limited installation space is available in the cutting head or installation space is only available in one direction. If there is no symmetrical continuation, then, according to embodiments, hydraulic balancing can be carried out. For this purpose, the continuations or the continuing bores in terms of their diameter, their length and/or their position may be dimensioned such that each continuing bore or each outgoing channel carries the same volume flow.

Figure 5:
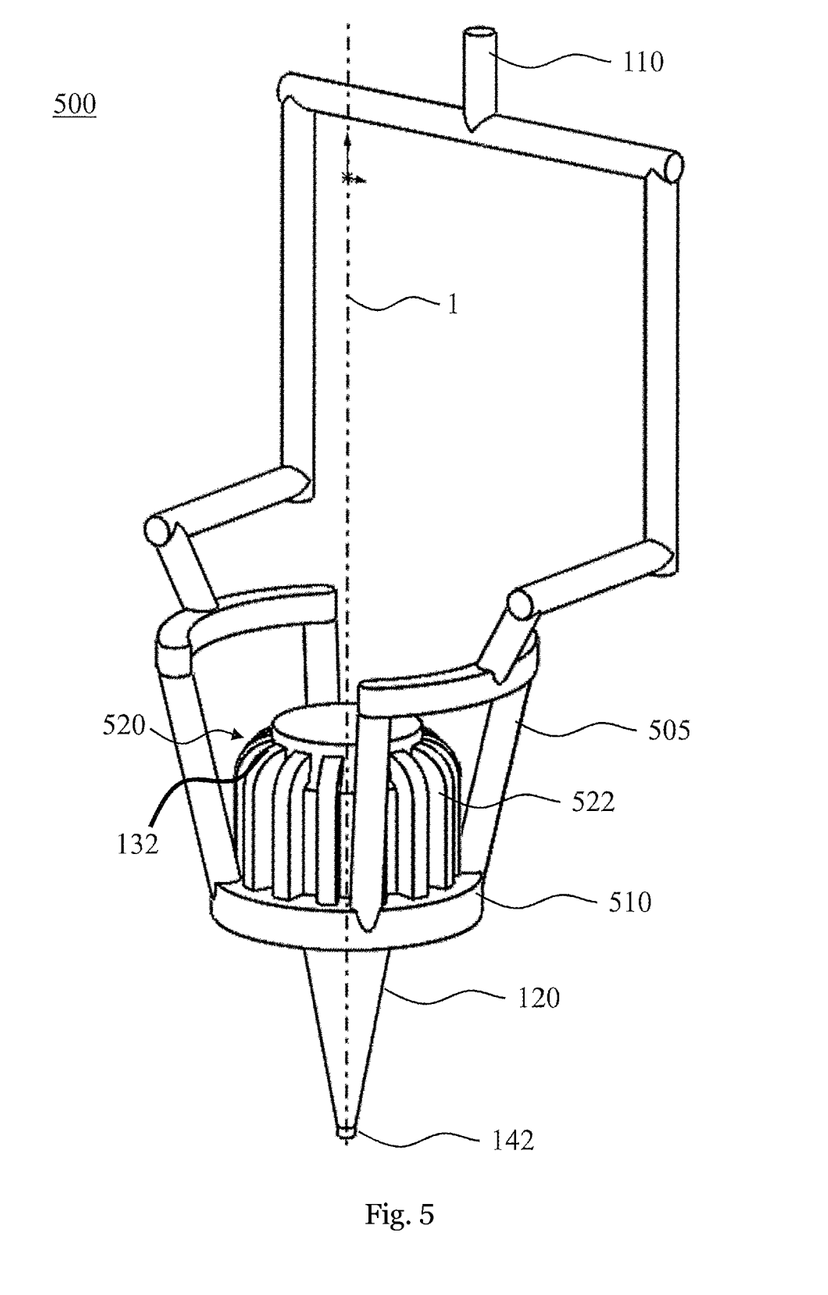
FIG. 5 is a schematic showing a gas channel system of a gas supply device according to still further embodiments of the present disclosure.

FIG. 5 shows a gas channel system 500 according to still further embodiments of the present disclosure.

According to embodiments, the gas supply device, and in particular the gas channel system 500, comprises at least one accumulation volume 510 and/or at least one rectifier element 520. The gas flow may be guided from the accumulation volume 510 via the rectifier element 520 into the shared volume 120. In particular, the rectifier element 520 may be arranged between the accumulation volume 510 and the shared volume 120.

The accumulation volume 510 ensures that the speed of the gas flow is reduced. Due to the conservation of energy, the static pressure of the flow increases at the same time. The more completely the flow is decelerated, the more uniform is the distribution of the static pressure in the accumulation volume 510. A uniform distribution of the static pressure in turn causes the exits of the accumulation volume 510 to be supplied uniformly with cutting gas, said cutting gas thus flowing into the shared volume 120 with a uniform distribution, for example over the periphery. The directional dependency that is imposed on the flow by the one-sided gas inlet 110 can thus be further reduced.

In the example of FIG. 5, the gas flow is first fanned out over four gas channels 505. The individual lines are then merged again in the accumulation volume 510, for example in the vicinity of the last optical element of the laser machining head. The accumulation volume 510 ensures an additional homogenization of the flow. From the accumulation volume 510, the gas is passed via the rectifier element 520 to the outlet openings 132 at the shared volume 120. In this way, it is ensured that the flow onto the last optical element is particularly uniformly distributed over the periphery and thus the flow variables in the shared volume 120 are also particularly uniformly distributed.

The rectifier element 520 may be selected from the group consisting of tube bundles, sieves, fins, honeycomb elements, calming sections and the like. For example, the rectifier element 520 may comprise a plurality of calming sections 522 distributed symmetrically around the periphery of the shared volume 120. The number of calming sections 522 may be between 4 and 24, or between 8 and 16. Furthermore, the calming sections may have a ratio D/L of section diameter D to section length L between 0.05 and 0.3, or between 0.1 and 0.3. The section diameter D may also be referred to as "channel width" or "tube diameter".

Figure 6A:
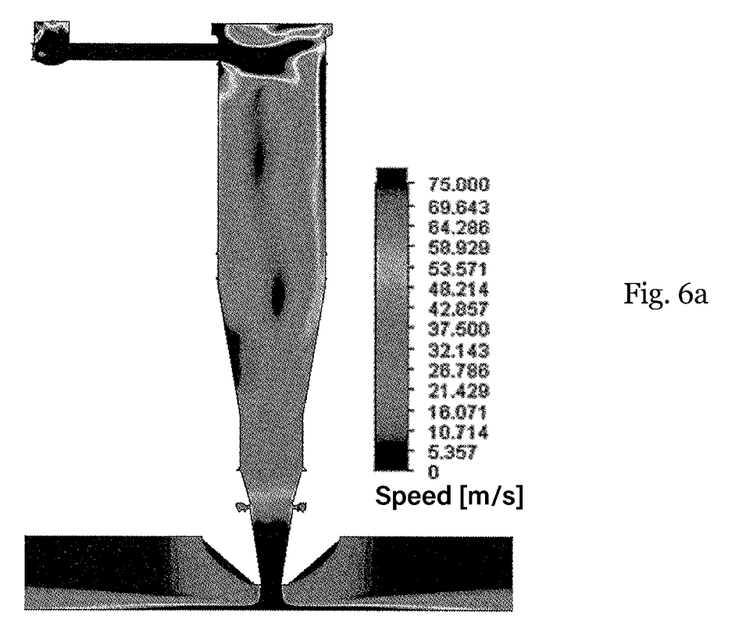
FIGS. 6A and B are illustrations showing simulated speed distributions in the shared volume.
Figure 6B:
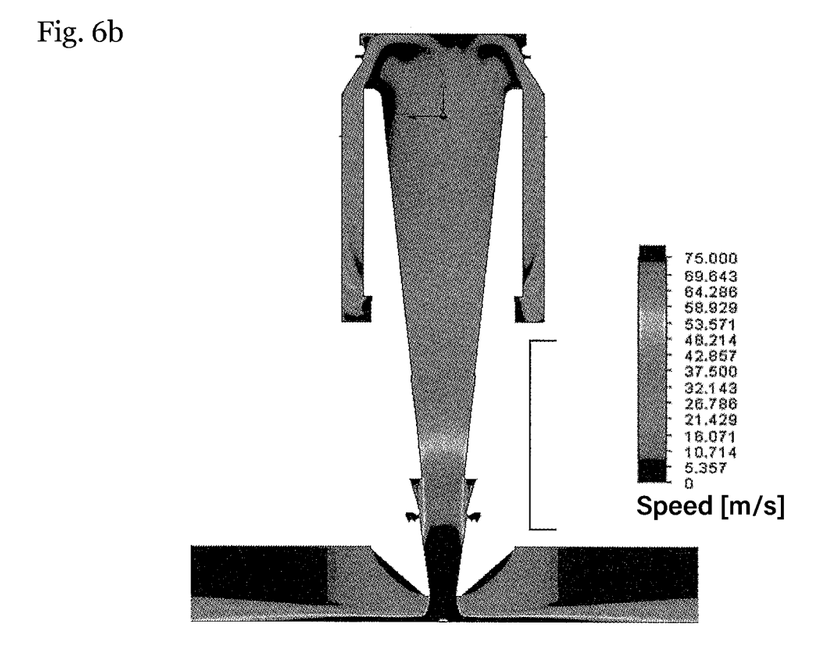

FIGS. 6A and B show simulated speed distributions in the shared volume. In particular, FIGS. 6A and B show CFD simulation results in the shared volume. The flow quantity considered in both figures is the absolute speed.

FIG. 6A shows a simulated speed distribution in the shared volume with one-sided supply of the cutting gas without the gas channel system according to the invention. The flow variable under consideration is distributed non-uniformly.

FIG. 6B shows a simulated speed distribution in the shared volume with fanned out and symmetrical supply of the cutting gas according to embodiments of the present disclosure. The flow variable under consideration is distributed uniformly. It is apparent, in particular, that the speed is distributed substantially more homogeneously in the shared volume in the case of a symmetrical supply line than in the case with a one-sided supply line.

Figure 7A:
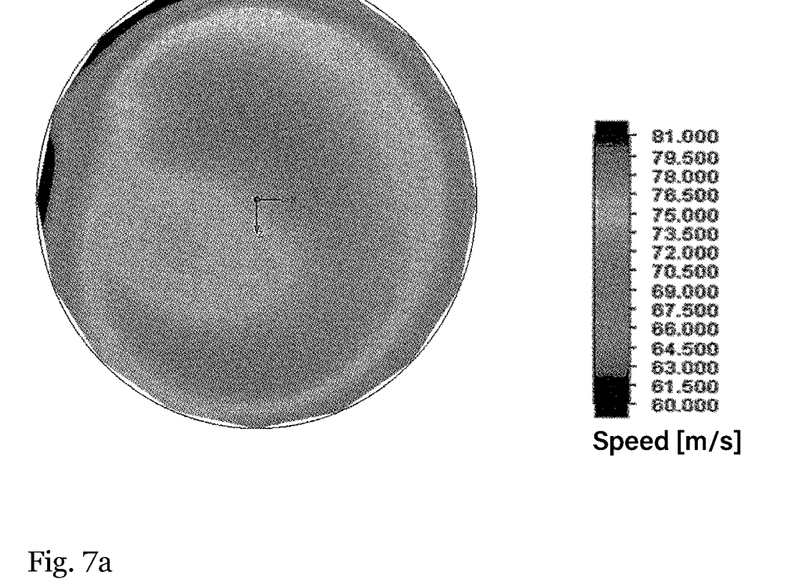
FIGS. 7A and B are illustrations showing simulated speed distributions in a horizontal cutting plane at the nozzle outlet.
Figure 7B:
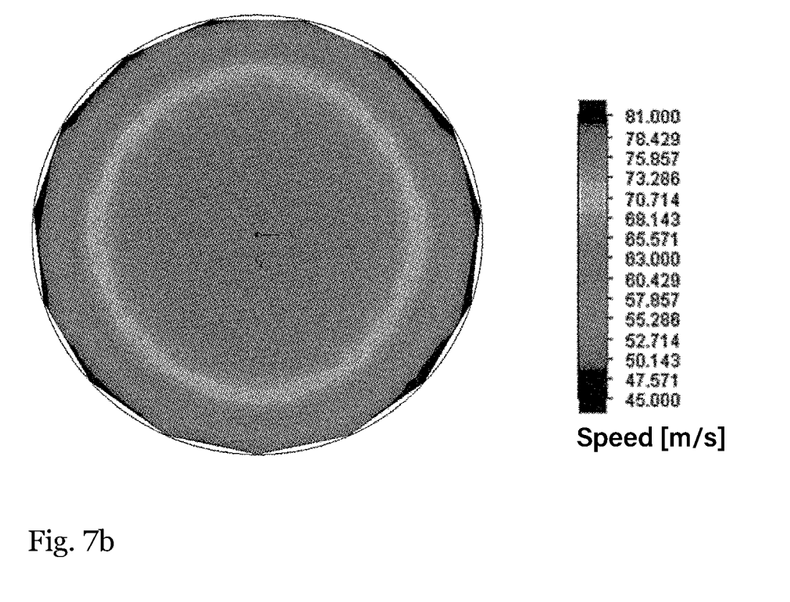

FIGS. 7A and B show simulated speed distributions in a horizontal sectional plane at the nozzle outlet and at the exit opening 142. In particular, the simulated speed distribution is shown in a horizontal sectional plane just above the nozzle outlet.

FIG. 7A shows a simulated speed distribution in a horizontal sectional plane at the nozzle outlet with one-sided supply of the cutting gas without the gas channel system according to the invention. The non-uniform distribution of the flow variable under consideration continues in the shared volume up to the exit opening 142.

FIG. 7B shows a simulated speed distribution in a horizontal cutting plane at the nozzle outlet with symmetrical supply of the cutting gas using the gas channel system according to the invention. The flow variable under consideration is also distributed much more uniform in the exit opening 142.

It is apparent that the homogeneity of the speed distribution in the shared volume also has an effect on the distribution at the nozzle outlet or at the exit opening 142. If there is only one supply line (FIG. 7A), the speed distribution is highly asymmetrical. The maximum is clearly shifted from the center and the minimum is present one-sidedly on a part of the periphery. In contrast thereto, in the fanned-out supply according to the invention, a rotationally symmetrical distribution of the speed is formed around the center point of the cutting circle, as shown in FIG. 7B. The maximum is in the center of the circle, the minimum is present in the entire periphery. With such a speed distribution, better cutting results can be achieved than in the case of the distribution of FIG. 7A.

According to the present disclosure, a branched gas channel system is used to homogenize a gas flow. In particular, the gas flow is split into a plurality of gas lines inside the head before entering the shared volume and merged again symmetrically in the shared volume. Here, corresponding lines or channels are subject to approximately the same volume flow. By splitting the gas flow according to the invention, e.g. in a laser machining head, the gas supply device according to the invention makes it possible to equalize essential flow variables at the gas outlet opening. This allows for an improved surface quality and perpendicularity of the cut edges and a higher cutting speed to be achieved.

The invention claimed is:

1. A gas supply device for a laser machining head for providing a gas flow, comprising:
   a gas inlet;
   a shared volume having a first end and a second end opposite the first end, the first end having an exit opening for providing the gas flow; and
   a gas channel system having a plurality of gas channels and at least two branching points, which are arranged consecutively along a flow path from the gas inlet to the shared volume, wherein a first gas channel connected to the gas inlet is split at a first one of the branching points into at least two second gas channels, wherein each of the at least two second gas channels are split into at least two third gas channels at second ones of the branching points, and wherein the plurality of gas channels connect the gas inlet with at least one outlet opening at the shared volume by connecting each of the third gas channels with the at least one outlet opening at the shared volume;
   wherein the shared volume is configured for the superimposition of a laser beam and the gas flow in the shared volume between the exit opening and the second end of the shared volume; and
   wherein the gas channel system is configured to provide a homogenous gas flow over a flow cross section of the exit opening.

2. The gas supply device according to claim 1, wherein paths are formed in said gas channel system, each path extends from said gas inlet to said at least one outlet opening, and lengths of said paths are the same.

3. The gas supply device according to claim 1, wherein said gas channels are shaped as bores.

4. The gas supply device according to claim 1, wherein said gas channel system is symmetrical to a plane which is parallel to an optical axis of said laser machining head and which extends through said gas inlet.

5. The gas supply device according to claim 4, wherein said plane is a central plane of said gas supply device.

6. The gas supply device according to claim 1, wherein an accumulation volume is arranged between said gas channels and said at least one outlet opening at said shared volume.

7. The gas supply device according to claim 6, wherein paths are formed in said gas channel system, each path extends from said gas inlet to said at least one outlet opening, and lengths of said paths are the same.

8. The gas supply device according to claim 1, further comprising an element arranged such that the gas flow is guided from said gas channel system via said element into said shared volume.

9. The gas supply device according to claim 8, wherein said element is selected from a group consisting of bundles of tubes, sieves, fins, honeycomb elements and calming sections.

10. The gas supply device according to claim 8, wherein said element comprises a plurality of calming sections distributed symmetrically around a periphery of said shared volume.

11. The gas supply device according to claim 10, wherein said element comprises between 4 and 24, inclusive, calming sections.

12. The gas supply device according to claim 1, wherein one of the gas channels of said gas channel system branches at each branching point into two or more subsequent gas channels.

13. The gas supply device according to claim 1, wherein said gas supply device forms part of said laser machining head.

14. A laser machining head comprising:
   a laser device for providing a laser beam; and
   a gas supply device for providing a gas flow,
      wherein the gas supply device comprises:
      a gas inlet;
      a shared volume;
         having a first end and a second end opposite the first end, the first end having an exit opening for providing the gas flow; and
      a gas channel system having a plurality of gas channels and at least two branching points, which are arranged consecutively along a flow path from a gas inlet to the shared volume, wherein a first gas channel connected to the gas inlet is split at a first one of the branching points into at least two second gas channels that are each split into at least two third gas channels at second ones of the branching points, wherein the plurality of gas channels connect the gas inlet with at least one outlet opening at the shared volume by connecting each of the third gas channels with the at least one outlet opening at the shared volume;

wherein the shared volume is configured for the superimposition of the laser beam and the gas flow in the shared volume between the exit opening and the second end of the shared volume.

15. The laser machining head according to claim 14, further comprising an optical element, wherein said shared volume of said gas supply device is arranged between said optical element and a nozzle opening of said laser machining head.

16. The laser machining head according to claim 14, further comprising an optical element, wherein said shared volume is arranged directly next to said optical element and said at least one outlet opening is oriented at an angle between 0° and 90° with respect to said optical element.

17. The laser machining head according to claim 14, wherein said gas inlet of said gas supply device is the only gas inlet for a cutting gas on said laser machining head.

18. The gas supply device according to claim 1, wherein said gas channel system is symmetrical to a plane which is a symmetry plane of said shared volume.

19. The gas supply device according to claim 4, wherein said plane is a central plane through one of the branching points of said gas channel system.

20. The gas supply device according to claim 10, wherein said calming sections have a ratio D/L of section diameter D to section length L between 0.05 and 0.3.

* * * * *